United States Patent
Velie et al.

[11] Patent Number: 6,123,101
[45] Date of Patent: Sep. 26, 2000

[54] SPRING BODY EXCESS FLOW VALVE

[75] Inventors: Wallace W. Velie, deceased, late of Alta Loma; by Neil Velie, executor, Thousands Oaks, both of Calif.

[73] Assignee: Magne-Flo Corporation, Valencia, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,334

[22] Filed: May 14, 1997

(Under 37 CFR 1.47)

[51] Int. Cl.$^7$ ................................................. F16K 15/00
[52] U.S. Cl. .............................................. 137/517; 137/498
[58] Field of Search .............................. 137/513.5, 513.3, 137/517, 498, 462

[56] References Cited

U.S. PATENT DOCUMENTS

| | | | |
|---|---|---|---|
| 351,159 | 10/1886 | Brengel | 137/517 |
| 922,578 | 5/1909 | Gries | 137/517 |
| 2,215,044 | 9/1940 | Kammerdiner . | |
| 2,367,662 | 1/1945 | Baxter | 137/517 |
| 2,469,505 | 5/1949 | Keefer | 137/517 |
| 2,569,316 | 9/1951 | Jerman . | |
| 2,584,418 | 2/1952 | Branson | 137/504 |
| 2,585,316 | 2/1952 | Hobson . | |
| 2,647,531 | 8/1953 | Berck | 137/517 |
| 2,949,931 | 8/1960 | Ruppright . | |
| 3,747,616 | 7/1973 | Lloyd . | |
| 3,756,272 | 9/1973 | Hammond | 137/498 |
| 3,974,852 | 8/1976 | Svensson | 137/498 |
| 4,105,044 | 8/1978 | Davitt | 137/517 |
| 4,212,313 | 7/1980 | Winters . | |
| 4,245,814 | 1/1981 | Shimizu . | |
| 4,382,449 | 5/1983 | Nelson . | |
| 4,485,832 | 12/1984 | Plemmons et al. . | |
| 4,565,208 | 1/1986 | Ritchie et al. . | |
| 4,715,394 | 12/1987 | O'Donnell et al. . | |
| 4,785,842 | 11/1988 | Johnson, Jr. . | |
| 4,842,198 | 6/1989 | Chang | 137/517 |
| 4,844,113 | 7/1989 | Jones . | |
| 4,874,012 | 10/1989 | Velie . | |
| 5,010,916 | 4/1991 | Albrecht . | |
| 5,052,429 | 10/1991 | Yoo . | |
| 5,119,841 | 6/1992 | McGill . | |
| 5,203,365 | 4/1993 | Velie . | |
| 5,409,031 | 4/1995 | McGill et al. . | |
| 5,465,751 | 11/1995 | Newton | 137/498 |
| 5,603,345 | 2/1997 | Franklin et al. . | |
| 5,613,518 | 3/1997 | Rakieski | 137/513.5 |

FOREIGN PATENT DOCUMENTS

| | | | |
|---|---|---|---|
| 1321991 | 9/1989 | Canada . | |
| 1287562 | 8/1972 | United Kingdom | 137/498 |

*Primary Examiner*—Denise L. Ferensic
*Assistant Examiner*—Joanne Y. Kim
*Attorney, Agent, or Firm*—Oppenheimer Wolff & Donnelly, LLP

[57] ABSTRACT

An safety valve includes a housing for defining a fluid flow passageway having a spring loaded seat body and spring mounted therein. The seat body is held in an open position by the spring and is composed of an elastomer material. According to the novel method of using the safety valve, when fluid flows against the seat body a resulting drag force causes the spring to compress. When the fluid flow reaches a predetermined excess flow rate level, the seat body sealingly engages the flow passage to substantially inhibit the flow of fluid except for a small by-pass flow passing downstream via a small channel disposed within the seat body.

15 Claims, 4 Drawing Sheets

SPRING BODY EXCESS FLOW VALVE

TECHNICAL FIELD

The present invention relates in general to an improved safety valve and a method of using it to control the flow of a fluid. The invention more particularly relates to an excess flow valve which provides a low by-pass flow according to a novel method.

BACKGROUND ART

The have been many different types and kinds of valves used to facilitate the controlling of fluid flow in the event of unwanted and undesired excess flow. For example reference may be made to the following U.S. Pat. Nos.: 2,215,044; 2,569,316; 2,585,316; 2,949,931; 3,747,616; 4,212,313; 4,245,814; 4,382,449; 4,485,832; 4,565,208; 4,715,394; 4,785,842; 4,844,113; 4,874,012; 5,010,916; 5,052,429; 5,119,841; 5,203,365; 5,409,031 and 5,603,345.

While many of the valves disclosed in the above referenced patent documents may have been satisfactory for some applications, it would he highly desirable to have a new and improved safety excess flow control valve that facilitates low by pass flow control in a relatively inexpensive manner.

Excess flow valves commonly use a spring loaded ball or pintle as a flow closure mechanism. The seat for such valves has typically been a hard metal surface that permits a sizable by-pass flow after valve closure. While such valves may have been acceptable for sizable by pass flows, such values have not been satisfactory for small by pass flows.

Therefore it would be highly desirable to have a new and improved safety excess flow control valve that utilizes a hard metal seat and that facilitates small by-pass flows in a relatively inexpensive manner.

SUMMARY OF INVENTION

Therefore the principal object of the present invention is to provide a new and improved safety excess flow control valve that utilizes a hard metal seat and that facilitates small by-pass flows.

Another object of the present invention is to provide such a new and improved safety excess flow control valve that is easy to install and that is relatively inexpensive to manufacture.

Briefly, the above and further objects of the present invention are realized by providing a new and improved safety excess flow control valve which achieves low by-pass flow utilizing a spring and hard metal seat method.

The safety excess flow control valve generally includes a housing for defining a fluid flow passageway and hard metal valve seat. A resilent valve seat body and spring are mounted in the fluid passageway where the valve seat body is held in a normally open position by the spring under normal fluid flow conditions. The valve seat body is composed of an elastomer material which sealingly engages the valve seat for closing the fluid passageway under excess flow conditions. More particularly, when fluid flowing in the upstream passageway exceeds a predetermined flow rate a resulting drag force is exerted by the seat body to cause the spring to compress. When the fluid flow rate reaches a predetermined closure level, the seat body engages the valve seat to substantially inhibit the flow of fluid downstream except for a small by-pass flow passing downstream via a channel disposed within the seat body.

BRIEF DESCRIPTION OF DRAWINGS

The above-mentioned and other objects and features of this invention and the manner of attaining them will become apparent, and the invention itself will be best understood by reference to the following description of an embodiment of the invention taken in conjunction with the accompanying drawings, wherein.

DESCRIPTION OF THE PREFERRED EMBODIMENT

Figure 1:
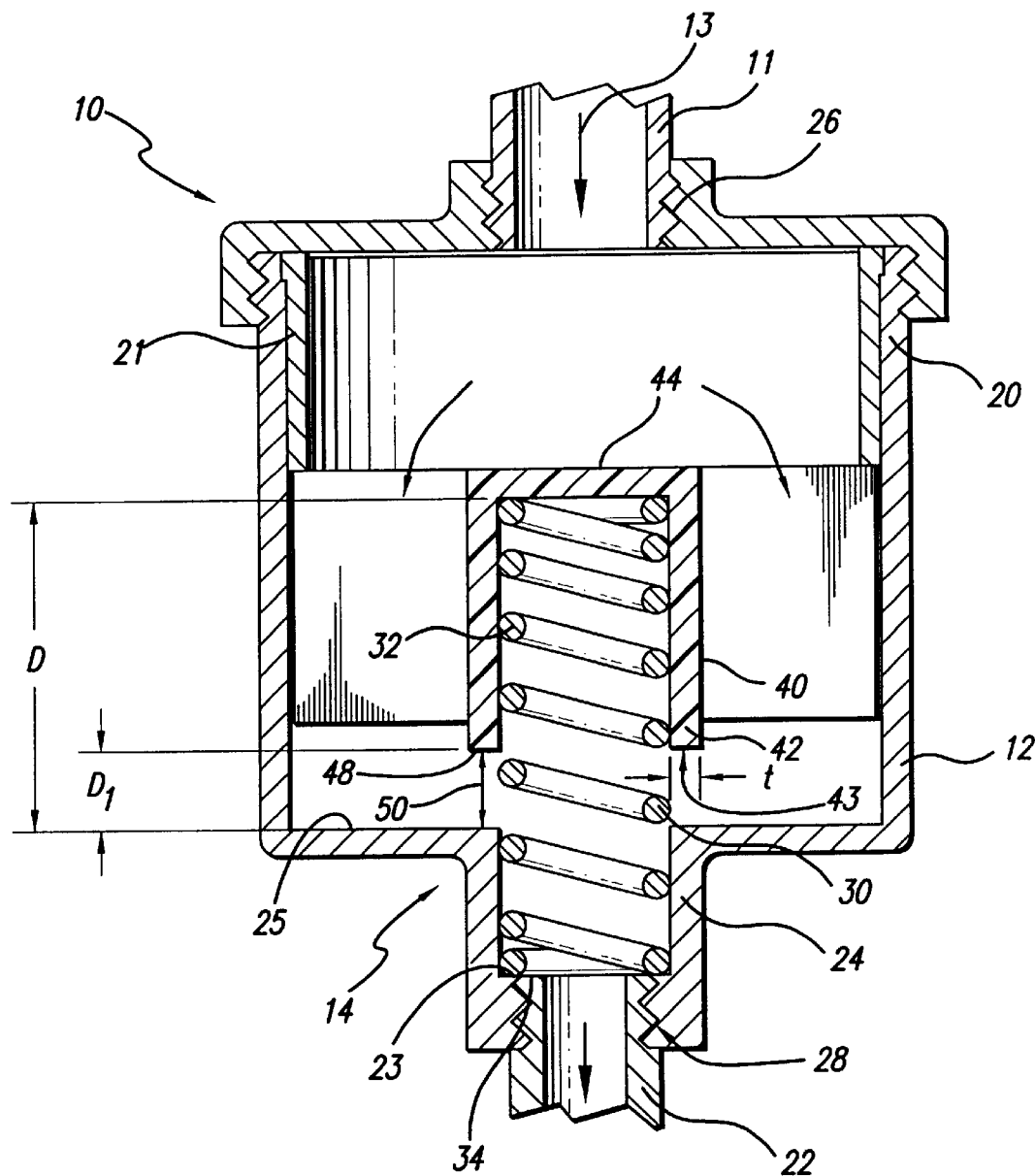
FIG. 1 is a fragmentary cross sectional elevational view of a safety excess flow control valve assembly 10 which is constructed in accordance with the present invention, illustrating the valve assembly in a normally open position.

Referring now to the drawings and more particularly to FIG. 1 thereof there is shown a safety excess flow control valve assembly 10 which is constructed in accordance with the present invention. The excess flow control valve assembly 10 is adapted to be mounted in line in a fluid delivery system 11 for substantially preventing the flow of fluid therefrom except for a small by-pass flow passing downstream whenever the flow of fluid entering the assembly from upstream exceeds a predetermined excess flow rate. The excess flow control valve assembly 10 is configured for a predetermined closure rate that is linearly dependent upon the upstream flow rate of fluids passing into the assembly 10. The flow rate of the fluid passing through the assembly 10 is controlled in accordance with the method of the present invention.

The excess flow control valve assembly 10 generally comprises an elongated housing member 12 that defines a fluid flow passageway 13 and a flow control valve arrangement 14 which is disposed within the passageway 13 for controlling excess fluid flow downstream of the assembly 10. As will be explained hereinafter in greater detail, whenever the fluid flow rate in the passageway 13 is below a predetermined closure level, the control valve arrangement 14 allows the fluid to pass therethrough substantially unobstructed. Once the flow rate of the fluid exceeds the predetermined closure level, the flow control valve arrangement 14 is activated to effect a linear closure flow rate. In this regard, when the fluid flow rate is below or at the predetermined level there is a maximum flow rate through the passageway 13. Thereafter, as the flow rate into the assembly 10 continues to increase, the valve arrangement 14 closes in a linear manner to restrict the amount of fluid that is discharged downstream of the assembly 10 from the maximum flow rate discharge to a minimum or by-pass flow rate discharge.

Considering now the housing member 12 in greater detail with reference to FIG. 1, the housing 12 is hollow throughout its entire length having an enlarged upstream end portion 20, a small or restricted downstream end portion 22 and an intermediate spring receiving portion 24, integrally connected to the upstream portion 20 and threadably connected to the downstream portion 22, and a hard metal valve seat 25.

As best seen in FIG. 1, the interior walls of the housing 12 are generally cylindrically shaped for facilitating the coupling the excess flow control valve assembly 10 in line with a conventional threaded pipeline, such as a gas pipeline of the fluid delivery system 11. Both end portions 20 and 22, are threaded at about 26 and 28 respectively to permit the valve assembly 10 to be easily installed at any convenient location in the fluid delivery system 11. In this regard, the assembly 10 is installed in the fluid delivery system 11 in the same convenient manner as a conventional pipe coupling.

Although in the preferred embodiment of the present invention the housing 12 is illustrated as having external and internal threads, those skilled in the art will understand that different thread or a combinations may be employed.

As best seen in FIG. 1, a shoulder 23 is formed between the upstream end of the small end portion 22 and the downstream end of the intermediate portion 24. As will be explained hereinafter in greater detail, the control valve arrangement 14 is supported in the passageway 13 between the shoulder 23 and an upstream retaining member 21.

Considering now the control valve arrangement 14 in greater detail with reference to FIG. 1, the control valve 14 generally includes two components: an elongated compression spring 30 and a valve or seat body member 40 which is supported from below by an upstream or proximal end 32 of the spring 30. As will be explained hereinafter in greater detail, the spring 30 hold the valve member 40 spaced apart from a valve seat 25 integrally formed in the housing 12 between the upstream enlarged portion 20 and the intermediate portion 24. The spring 30, in turn, is supported from below at its downstream distal end 34 by the shoulder 23. In this regard, the diameter of the spring 30 is substantially larger than the diameter of the downstream small end portion 22 and slightly smaller than the inside diameter of the intermediate portion 24 to enable the spring 30 to be held in the passageway 13 with its longitudinal axis (l) being in substantial coextensive alignment with the longitudinal axis (L) of the housing 12.

Considering now the spring 30 in greater detail with reference to FIG. 1, the spring 30 is selected to have a spring constant (K) that allows the closure flow rate of the control valve 14 to be controlled in accordance with the value of (K) and the amount of drag force created by the valve member 40 in response to the flow rate of the fluid entering the passageway 13. In this regard, the spring 30 is selected to have an overall length (ol) that is substantially greater than the overall length (OL) of the intermediate portion 24 so that the proximal or upstream end 32 of the spring 30 is spaced apart from the valve seat 25 by about a distance (D). The distance (D) is selected so the distal end of the valve member 40 is spaced from the valve seat 25 by about a distance of D1 meters, where the distance D1 is slightly less than the maximum distance that spring 30 will compress under the drag force created when the flow rate exceeds the predetermined excess flow rate. The spring 30 therefore will compress a sufficient distance to cause the distal end of the valve member 40 to sealingly engage the hard metal valve seat 25 when the flow rate exceeds the predetermined excess flow rate level.

Figure 3:
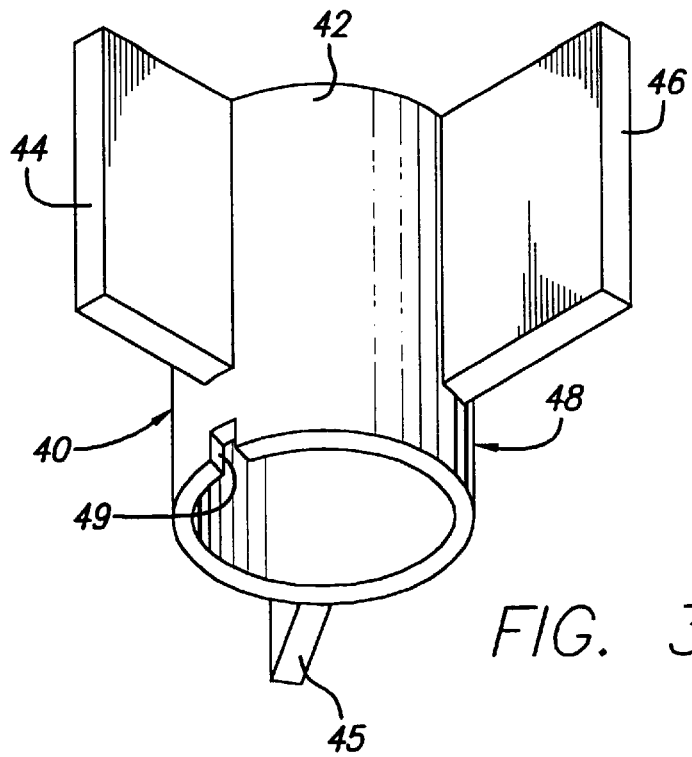
FIG. 3 is a pictorial view of the valve body of FIG. 1 and FIG. 2.

Considering now the valve body member 40 in greater detail with reference to FIGS. 1 and 3, the valve seat body member 40 is composed of a resilient or elastomer material that imparts a flexibility to the seat body member 40. The resilient nature of the seat body member 40 enable the complete closure of the passageway 13 except for the small by-pass flow that will be described hereinafter in greater detail.

The valve body member 40 generally includes a hollow cylindrical seat body 42 having a closed upstream or proximal end 44 that is substantially perpendicular to the passageway 13 for helping to create a drag force in response to upstream fluid passing through said fluid passageway 13 and an open downstream or distal end indicated generally at 43 for receiving a portion of the spring 30 therein. The distal end 43 of the seat body 40 includes a downwardly depending annular skirt 48 that is sufficiently thin and flexible to sealingly engage the seat 25 for closing the passageway 13. The skirt 48 has a small cut out portion 49 at its periphery that allows a small controlled by pass flow of fluid to pass therethrough when the skirt 48 is in full sealing engagement with the seat 25.

Considering now the seat body 42 in greater detail with reference to FIGS. 1 and 3, the seat body 42 is hollow throughout its entire length and has an inside diameter that is sufficiently large to permit the proximal end 32 of the spring 30 to be received therein for supporting the body 42 with its longitudinal axis in substantial coextensive alignment with the longitudinal axes (l) and (L) of the spring 30 and the housing 12 respectively. A plurality of protrusions or fins, such as the fins 44–46, extend radially outwardly from about an exterior wall portion 43 of the seat body 42 for guiding its movement in the fluid passageway 13. In this regard, as the force of the fluid entering the assembly 10 from the upstream fluid delivery system 11 is directed against the proximal end 44 of the seat body 42, a drag force of (F) pounds per square inch is translated to the spring 30.

So long as the drag force (F) is not greater than the compression force (f) of the spring 30, the body member 42 will be guided by the fins 44–46 through the fluid, passing through the passageway 13, in a relatively stationary position relative to the valve seat 25. However, once the drag force (F) exceeds the compression force (f) of the spring 30, the spring 30 will begin to compress allowing the body seat member 42 to be moved toward the valve seat 25. In this regard, as the spring 30 compresses, the body member 42 will travel along a path of travel 50 guided by the fins 44–46 to cause the skirt 48 to come into sealing engagement with the seat 25.

Although the proximal end of the seat body 42 is described as being perpendicular to the passageway 13, those skilled in the art will understand that different proximal end configurations can be employed to effect different drag force values, which in turn, will cause different closure rates.

From the foregoing, those skilled in the art will understand that positive seat sealing is an important design consideration that can be encourage or implemented by: 1) assuring that the seat body 42 is formed from a reasonably resilient material; 2) by keeping the body thickness (t) of the skirt 48 relatively thin or narrow; 3) by contouring the seat 25; and 4) by utilizing a precise manufacturing technique for the molding of the sealing surface of the skirt 48 and the seat 25.

Figure 2:
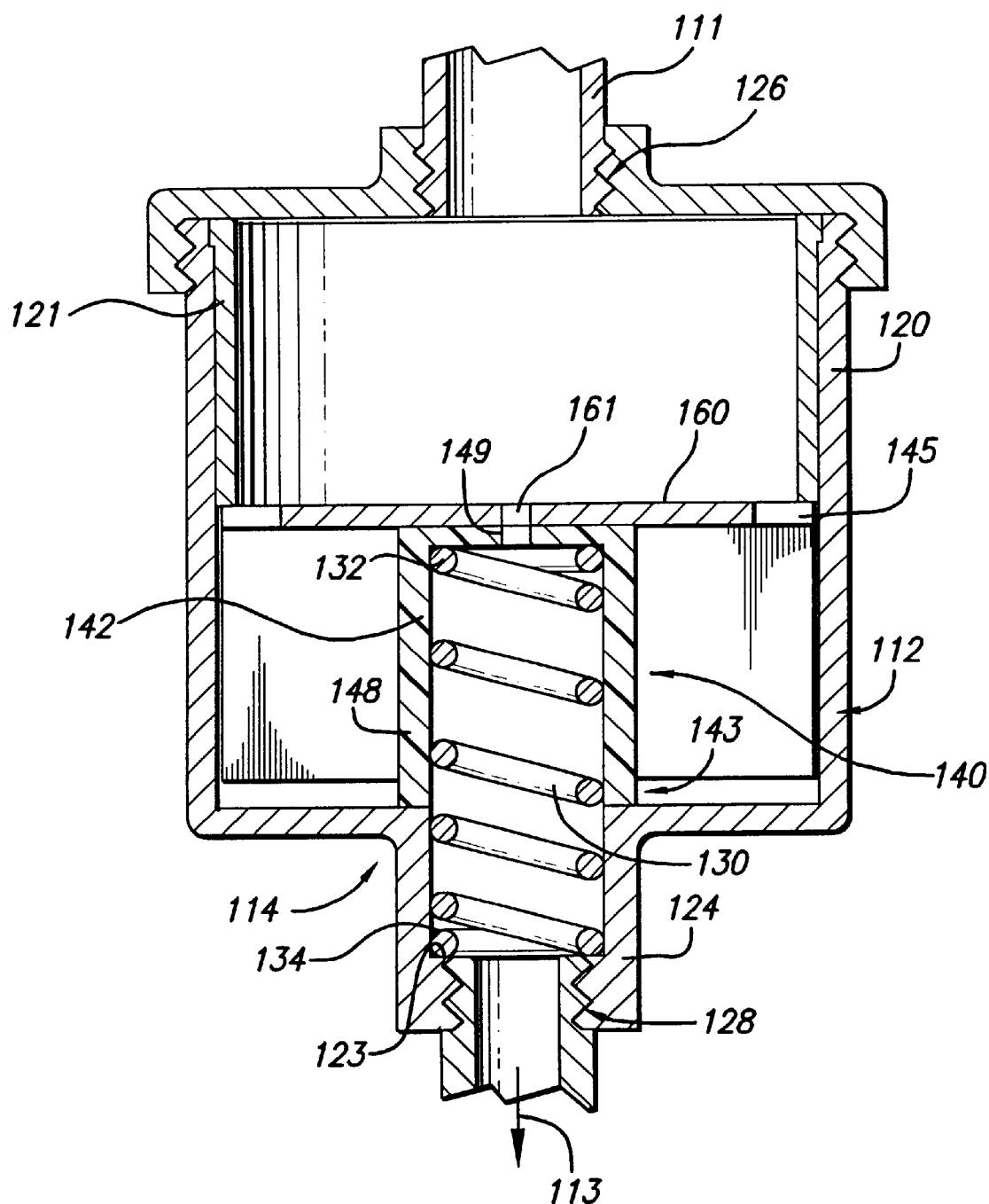
FIG. 2 is a fragmentary cross sectional elevational view of another excess flow shut off valve assembly which is constructed in accordance with the present invention, illustrating the valve assembly in a closed position.

Referring now to the drawings and more particularly to FIG. 2 thereof there is shown a safety excess flow control valve assembly 110 which is constructed in accordance with the present invention. The excess flow control valve assembly 110 is adapted to be mounted in line in a fluid delivery system 111 for substantially preventing the flow of fluid therefrom except for a small by-pass flow passing downstream whenever the flow of fluid entering the assembly 110 from upstream exceeds a predetermined excess flow rate. The excess flow control valve assembly 110 is configured for a predetermined closure rate that is linearly dependent upon the upstream flow rate of fluids passing into the assembly 110. The flow rate of the fluid passing through the assembly 110 is controlled in accordance with the method of the present invention.

The excess flow control valve assembly 110 generally comprises an elongated housing member 112 that defines a fluid flow passageway 113 and a flow control valve arrangement 114 which is disposed within the passageway 113 for controlling excess fluid flow downstream of the assembly 10. As will be explained hereinafter in greater detail, whenever the fluid flow rate in the passageway 113 is below a predetermined closure level, the control valve arrangement 114 allows the fluid to pass therethrough substantially unobstructed. Once the flow rate of the fluid exceeds the predetermined closure level, the flow control valve arrangement 114 is activated to effect a linear closure flow rate. In this regard, when the fluid flow rate is below or at the predetermined level there is a maximum flow rate through the passageway 113. Thereafter, as the flow rate into the assembly continues to increase, the valve arrangement 114 closes in a linear manner to restrict the amount of fluid that is discharged downstream of the assembly 110 from the maximum flow rate discharge to a minimum or by-pass flow rate discharge.

Considering now the housing member 112 in greater detail with reference to FIG. 2, the housing 112 is hollow throughout its entire length having an enlarged upstream end portion 120, a small or restricted downstream end portion 122 and an intermediate spring receiving portion 124 integrally connected to the upstream portion 120 and threadably connected to the downstream portion 122.

As best seen in FIG. 2, the interior walls of the housing 112 are generally cylindrically shaped for facilitating the coupling the excess flow control valve assembly 110 in line with a conventional threaded pipeline, such as a gas pipeline of the fluid delivery system 111. Both end portions 120 and 122, are threaded at about 126 and 128 respectively to permit the valve assembly 110 to be easily installed at any convenient location in the fluid delivery system.

As best seen in FIG. 2, a shoulder 123 is formed between the upstream end of the small end portion 122 and the downstream end of the intermediate portion 124. As will be explained hereinafter in greater detail, the control valve arrangement 114 is supported in the passageway 113 between the shoulder 123 and an upstream retaining member 121.

Considering now the control valve arrangement 114 in greater detail with reference to FIG. 2, the control valve 114 generally includes two components: an elongated compression spring 130 and a valve or seat body member 140 which is supported from below by an upstream or proximal end 132 of the spring 130. As will be explained hereinafter in greater detail, the spring 130 hold the seat body member 140 spaced apart from a valve seat 125 integrally formed in the housing 112 between the upstream enlarged portion 120 and the intermediate portion 124. The spring 130, in turn, is supported from below at its downstream distal end 134 by the shoulder 123. In this regard, the diameter of the spring 130 is substantially larger than the diameter of the downstream small end portion 122 and slightly smaller than the inside diameter of the intermediate portion 124 to enable the spring 130 to be held in the passageway 113 with its longitudinal axis (l) being in substantial coextensive alignment with the longitudinal axis (L) of the housing 112.

The overall length (ol) of the spring 130 is substantially greater than the overall length (OL) of the intermediate portion 124 so that the proximal or upstream end 132 of the spring 130 is spaced apart from the valve seat 125 by about a distance (D). The spring 130 is selected to have a spring constant (K) that allows the closure flow rate of the control valve 114 to be controlled in accordance with the value of (K) and the amount of drag force created by the valve body member 140. Thus, the larger the value of (K) and the amount of drag force created by the valve body member 140, the greater the upstream fluid flow rate required to close the valve 114 to its by-pass flow rate level.

Considering now the valve body member 140 in greater detail with reference to FIG. 2, the valve seat body member 140 is composed of a resilient or elastomer material that imparts a flexibility to the seat body member 140. The resilient nature of the seat body member 140 enable the complete closure of the passageway 113 except for the small by-pass flow that will be described hereinafter in greater detail.

The valve body member 140 generally includes a hollow cylindrical seat body 142 having a closed upstream or proximal end 144 for helping to create a drag force in response to upstream fluid passing through said fluid passageway 113 and an open downstream or distal end indicated generally at 143 for receiving a portion of said spring 30 therein. The closed end 144 has a small centrally disposed aperture or hole 149 that allows a small controlled by pass flow of fluid to pass therethrough when the seat body 140 is in full sealing engagement with the seat 125. In this regard, the seat body 140 includes an downwardly depending annular skirt 148 that is sufficiently thin and flexible to sealingly engage the seat 125 for closing the passageway 113.

Considering now the seat body 142 in greater detail with reference to FIG. 2, the seat body 142 is hollow throughout its entire length and has an inside diameter that is sufficiently large to permit the proximal end 132 of the spring 130 to be received therein for supporting the body 42 with its longitudinal axis in substantial coextensive alignment with the longitudinal axes (l) and (L) of the spring 130 and the housing 112 respectively.

Figure 5:
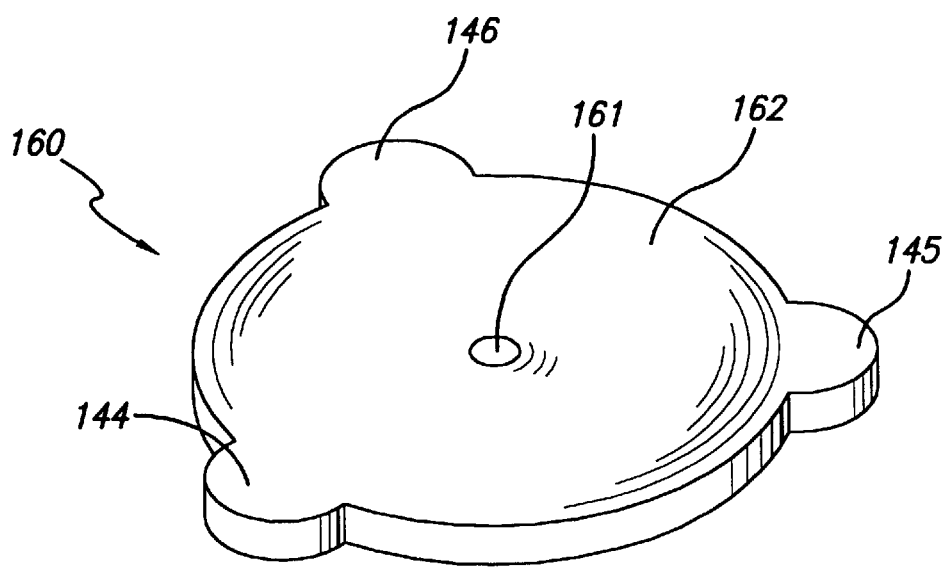
FIG. 5 is a pictorial view of a flow control plate of FIG. 2.
Figure 4:
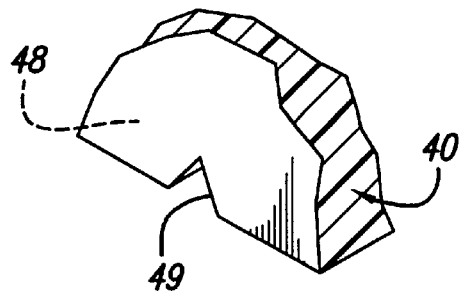
FIG. 4 is a fragmentary view of the bottom skirt of the valve body of FIG. 1 and FIG. 2.

In order to help facilitate directing the flow of fluid toward the seat body 142, the valve assembly 110 also includes a flow plate 160 (FIGS. 2 and 5) which is supported from below by the seat body 142. The flow plate 160 includes a flat thin body portion 162 having a small centrally disposed by pass hole 161 that facilitate the flow of a small by pass flow via the aligned by-pass 149 disposed in the seat body 140 when the seat body 142 is in full engagement with the valve seat 125. A plurality of protrusions or fins, such as the fins 144–146, extend radially outwardly from the body 162 of the plate 160 for guiding its movement in the fluid passageway 113 against the seat body 140. In this regard, as the force of the fluid entering the assembly 110 from the upstream fluid delivery system is directed against the plate 160 and the proximal end 144 of the seat body 142, a drag force of (F) pounds per square inch is translated to the spring 130.

Figure 6:
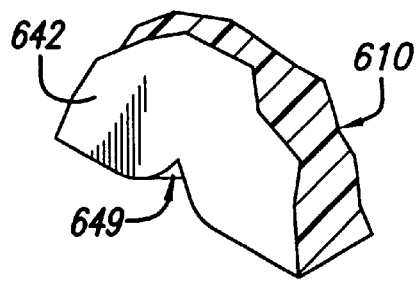
FIG. 6 is an enlarged fragmentary pictorial view of another excess flow shut off valve assembly which is constructed in accordance with the present invention, illustrating the valve seat body thereof.

Referring now to the drawings and more particularly to FIG. 6 thereof, there is shown a safety excess flow control valve assembly 610 which is constructed in accordance with the present invention, The excess flow control valve assembly 610 is adapted to be mounted in line in a fluid delivery system for substantially preventing the flow of fluid therefrom except for a small by-pass flow passing downstream whenever there is an excess flow of fluid entering the assembly from upstream. The excess flow control valve assembly 610 is configured for a predetermined closure rate that is linearly dependent upon the upstream flow rate of fluids passing into the assembly 610. The flow rate of the fluid passing through the assembly 610 is controlled in accordance with the method of the present invention.

The excess flow control valve assembly 610 is substantially similar to the excess flow control valve assembly 10 except it include a seat body 642 having a downwardly depending rounded skirt 648 with a channel 649.

Figure 7:
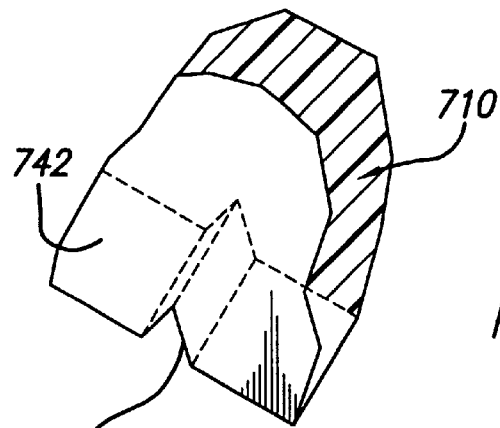
FIG. 7 is an enlarged fragmentary pictorial view of another excess flow shut off valve assembly which is constructed in accordance with the present invention, illustrating the valve seat body thereof.

Referring now to the drawings and more particularly to FIG. 7 thereof, there is shown a safety excess flow control valve assembly 710 which is constructed in accordance with the present invention, The excess flow control valve assembly 710 is adapted to be mounted in line in a fluid delivery system for substantially preventing the flow of fluid therefrom except for a small by-pass flow passing downstream whenever there is an excess flow of fluid entering the assembly from upstream. The excess flow control valve assembly 710 is configured for a predetermined closure rate that is linearly dependent upon the upstream flow rate of fluids passing into the assembly 710. The flow rate of the fluid passing through the assembly 710 is controlled in accordance with the method of the present invention.

The excess flow control valve assembly 710, is substantially similar to the excess flow control valve assembly 10 except it include a seat body 740 having a downwardly depending outwardly tapered skirt 748 with a by pass channel 749.

Figure 8:
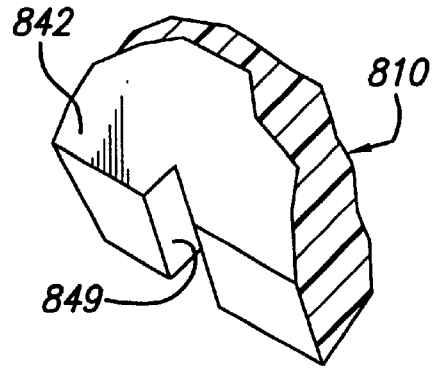
FIG. 8 is an enlarged fragmentary pictorial view of another excess flow shut off valve assembly which is constructed in accordance with the present invention, illustrating the valve seat body thereof.

Referring now to the drawings and more particularly to FIG. 8 thereof, there is shown a safety excess flow control valve assembly 810 which is constructed in accordance with the present invention, The excess flow control valve assembly 810 is adapted to be mounted in line in a fluid delivery system for substantially preventing the flow of fluid therefrom except for a small by-pass flow passing downstream whenever there is an excess flow of fluid entering the assembly from upstream. The excess flow control valve assembly 810 is configured for a predetermined closure rate that is linearly dependent upon the upstream flow rate of fluids passing into the assembly 810. The flow rate of the fluid passing through the assembly 810 is controlled in accordance with the method of the present invention.

The excess flow control valve assembly 810, is substantially similar to the excess flow control valve assembly 810 except it include a seat body 840 having a downwardly depending inwardly tapered skirt 848 with a by pass channel 849.

While a particular embodiment of the present invention has been disclosed, it is to be understood that various different modifications are possible and are contemplated within the true spirit and scope of the appended claims. Thus for example, rather than disposing the by pass hole in the top of the seat body 40 such as a hole or aperture can be disposed at any convenient location on the seat body member 42. Alternatively, in order to vary closure flow rate the annular plate 160 disposed between the retaining member 121 and the seat body 142 may have different forms of protrusions with different spacing. And yet other configurations for control the closure rate would include having seat bodies with different diameters at their upstream proximal end. Accordingly, there is no intention of limitations to the exact abstract or disclosure herein presented.

I claim:

1. A safety excess flow shut off valve for a fluid delivery system, comprising:

a hollow housing mounted in the fluid delivery system for defining a fluid flow passageway and a valve seat, said housing having an upstream end and a downstream end, said upstream end including an inlet for receiving upstream fluid from the fluid delivery system and said downstream end including an outlet for discharging the received fluid downstream in the fluid delivery system;

an intermediate portion of the housing disposed between the outlet and the valve seat, the intermediate portion including a ledge at a downstream end;

a valve body mounted within said fluid passageway for moving between an open position and a closed position to control excess fluid flow along said fluid passageway;

said valve body having at least one by-pass channel for facilitating a small by-pass flow of fluid when said valve body is moved to said closed position blocking said fluid passageway;

a spring mounted within said fluid passageway for holding said valve body in a normally opened position when the flow of fluid along said passageway is below a predetermined level and for compressing under a drag force created by said valve body as the flow of fluid along said passageway exceeds said predetermined level to allow said valve body to substantially seal the fluid passageway except for said small by-pass flow of fluid traveling along said channel, the spring extending from upstream of the valve seat through the fluid flow passageway surrounded by the valve seat and into the intermediate portion, the spring being supported at a downstream end by the annular ledge of the intermediate portion; and wherein said valve body includes:

a hollow cylindrical seat body member having a closed upstream end to create a drag force in response to upstream fluid passing through said fluid flow passageway and an open downstream end including a cylindrical shaped skirt defining a spring receiving opening at the open downstream end of said body member and having a distal end portion, said cylindrical seat body member receiving an upstream end of the spring;

wherein said skirt is configured to sealingly engage said valve seat to facilitate the blocking of said fluid flow passageway when said distal end portion of said skirt engages said seat; and a cylindrical upstream retaining member defining an annular ledge, said retaining member being inserted in the upstream end and said annular ledge cooperating with the hollow cylindrical seat body member to limit upstream movement of said seat body member.

2. A safety shut off valve according to claim 1, wherein said at least one by-pass channel is provided in said distal end portion of said skirt to permit said by-pass flow when said valve seat body is in sealing engagement with said seat.

3. A safety shut off valve according to claim 2, wherein said by pass channel is a notch formed in said distal end.

4. A safety shut off valve according to claim 2, wherein said by pass channel is a groove formed in said distal end.

5. A safety shut off valve according to claim 1, wherein said valve seat body distal end portion defines a rounded seat end.

6. A safety shut off valve according to claim 1, wherein said valve seat body distal end portion defines an inwardly tapered seat end.

7. A safety shut off valve according to claim 1, wherein said valve seat body distal end portion defines an outwardly tapered seat end.

8. A safety shut off valve according to claim 1, further comprising:
   a thin annular plate disposed at the upstream end of said valve seat body for facilitating another predetermined closure flow rate.

9. A safety excess flow shut off valve for a fluid delivery system, comprising:
   a hollow housing mounted in the fluid delivery system for defining a fluid flow passageway and an annular valve seat, said housing including an inlet for receiving upstream fluid from the fluid delivery system and an outlet for discharging the received fluid downstream in the fluid delivery system, the housing having an enlarged upstream end portion, a restricted downstream portion, and an intermediate spring receiving portion, and the housing defining the annular valve seat between the enlarged upstream end portion and the intermediate spring receiving portion;
   a valve body composed of a resilient material and mounted within said fluid passageway for moving between an open position and a closed position to control excess fluid flow along said fluid passageway, said valve body including a cylindrical seat body including a cylindrically shaped hollow skirt having a sufficiently thin and elastic annular distal end portion to sealingly engage said annular valve seat to facilitate the blocking of said fluid passageway when said valve body is in said closed position,
   said valve body having at least one by-pass channel for facilitating a small by-pass flow of fluid along said fluid passageway when said valve body is moved to said closed position blocking said fluid passageway; and
   a spring mounted within said fluid passageway for holding said valve body in a normally opened position when the flow of fluid along said passageway is below a predetermined level and for compressing under a drag force created by said valve body as the flow of fluid along said passageway exceeds said predetermined level to allow said valve body to substantially seal the fluid passageway except for said small by-pass flow of fluid traveling along said channel, the spring being received at an upstream end in the cylindrical seat body including the cylindrically shaped hollow skirt, and at a downstream end being received in said intermediate spring receiving portion; and
   a cylindrical upstream retaining member inserted in said upstream end, said upstream retaining member defining an annular ledge cooperating with the valve body to limit upstream movement of the valve body.

10. A safety excess flow shut off valve according to claim 9, wherein said hollow cylindrical skirt portion body distal end portion defines a rounded seating end.

11. A safety excess flow shut off valve according to claim 9, wherein said hollow cylindrical skirt portion body distal end portion defines an inwardly tapered seating end.

12. A safety excess flow shut off valve according to claim 9, wherein said hollow cylindrical skirt portion body distal end portion defines an outwardly tapered seating end.

13. The safety excess flow shut off valve according to claim 9, wherein said valve body further comprises a plurality of protrusions extending radially outward from the cylindrical body member, the protrusions guiding the movement of the valve seat body in the fluid passageway while allowing the flow of fluid between an outer surface of the cylindrical seat body member and the inner side wall of the housing, and where the valve further comprises an upstream retaining member disposed within said housing adjacent the upstream end, the upstream retaining member defining an annular ledge, the protrusions cooperating with the upstream retaining member to limit upstream movement of the valve body within the housing.

14. The safety excess flow shut off valve of claim 13, wherein said housing further comprises an upstream portion threaded into the remainder of the housing, and said upstream retaining member is adjacent said upstream portion.

15. The safety excess flow shut off valve of claim 14, wherein said upstream retaining member is a separate hollow cylindrical member held between the valve body member and the upstream portion of the housing by the spring.

* * * * *

UNITED STATES PATENT AND TRADEMARK OFFICE
CERTIFICATE OF CORRECTION

PATENT NO : 6,123,101

DATED : Sep. 26, 2000

INVENTOR(S) : Wallace W. Velie, deceased, late of Alta Loma; by Neil Velie, executor Thousand Oaks, both of Calif.

It is certified that error appears in the above-identified patent and that said Letters Patent are hereby corrected as shown below:

Name of Assignee:

Mallard Products, Inc.

1421 Pleasant Oaks Place

Thousand Oaks, California 91362

Signed and Sealed this

First Day of May, 2001

*Attest:*

NICHOLAS P. GODICI

*Attesting Officer*     *Acting Director of the United States Patent and Trademark Office*